US009630287B2

(12) United States Patent
Schuele et al.

(10) Patent No.: US 9,630,287 B2
(45) Date of Patent: Apr. 25, 2017

(54) HAND POWER TOOL

(71) Applicant: Robert Bosch GmbH, Stuttgart (DE)

(72) Inventors: Manfred Schuele, Sulzbach-Laufen (DE); Helmut Wanek, Kirchheim/Neckar (DE); Cornelius Boeck, Kirchheim (DE); Joachim Schadow, Stuttgart (DE); Joerg Maute, Sindelfingen (DE); Florian Esenwein, Leinfelden-Echterdingen (DE); Manfred Lutz, Filderstadt (DE); Daniel Barth, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/178,385

(22) Filed: Feb. 12, 2014

(65) Prior Publication Data

US 2014/0242887 A1 Aug. 28, 2014

(30) Foreign Application Priority Data

Feb. 22, 2013 (DE) ........................ 10 2013 202 946

(51) Int. Cl.
*B24B 23/02* (2006.01)
*B23Q 11/12* (2006.01)
*B25F 5/00* (2006.01)

(52) U.S. Cl.
CPC .......... *B23Q 11/127* (2013.01); *B24B 23/028* (2013.01); *B25F 5/008* (2013.01)

(58) Field of Classification Search
CPC ....... B24B 23/02; B24B 23/028; B23C 11/12; B25F 5/008
USPC ............ 451/449, 358, 359, 7, 488, 294, 295
See application file for complete search history.

(56) References Cited

U.S. PATENT DOCUMENTS

| | | | | |
|---|---|---|---|---|
| 6,320,286 | B1 * | 11/2001 | Ramarathnam | 310/50 |
| 8,816,544 | B2 * | 8/2014 | Tanimoto et al. | 310/50 |
| 2002/0034682 | A1 * | 3/2002 | Moores et al. | 429/120 |
| 2005/0153636 | A1 * | 7/2005 | Numata et al. | 451/358 |
| 2009/0103263 | A1 * | 4/2009 | Fuchs et al. | 361/695 |
| 2009/0145621 | A1 * | 6/2009 | Lau | B25F 5/008 173/217 |
| 2010/0253162 | A1 * | 10/2010 | Sakamaki et al. | 310/50 |
| 2011/0171887 | A1 * | 7/2011 | Tanimoto et al. | 451/359 |
| 2014/0338948 | A1 * | 11/2014 | Hester | B25F 5/008 173/217 |

FOREIGN PATENT DOCUMENTS

| | | | |
|---|---|---|---|
| DE | 34 30 023 | A1 | 2/1986 |
| DE | 10 2010 030 412 | A1 | 12/2011 |
| JP | 2008-125296 | A | 5/2008 |

OTHER PUBLICATIONS

International Electrotechnical Commission; Hand-held motor-operated electric tools—Safety; International Standard 60745-1; ICS 25.140.20; Aug. 2002; 26 Pages; IEC Central Office, Geneva, Switzerland.

* cited by examiner

*Primary Examiner* — Robert Rose
(74) *Attorney, Agent, or Firm* — Maginot, Moore & Beck LLP

(57) ABSTRACT

A hand power tool includes a drive unit, an electronic unit, and a cooling device configured to cool at least one of the drive unit and the electronic unit. The hand power tool also includes at least one of an open-loop control unit and a closed-loop control unit configured to control the cooling device.

17 Claims, 2 Drawing Sheets

28
24
22
26
32
30
36
34
38
42
40

HAND POWER TOOL

This application claims priority under 35 U.S.C. §119 to patent application number DE 10 2013 202 946.2, filed on Feb. 22, 2013 in Germany, the disclosure of which is incorporated herein by reference in its entirety.

BACKGROUND

The disclosure is based on a hand power tool, in particular an angle grinder, having a drive unit and an electronic unit, and having a cooling device provided, at least partially, for cooling the drive unit and/or the electronic unit.

SUMMARY

It is proposed that the hand power tool comprise an open-loop and/or closed-loop control unit, which is provided, at least partially, for open-loop and/or closed-loop control of the cooling device. A "drive unit" in this context is to be understood to mean, in particular, a unit provided, at least partially, to drive an insert tool coupled to the hand power tool, in an operating state. "Provided" is to be understood to mean, in particular, specially configured and/or specially equipped. The drive unit preferably comprises at least one electric motor. It is also conceivable, however, for the drive unit to be realized, at least partially, such that it can be driven pneumatically and/or in another manner considered appropriate by persons skilled in the art. An "electronic unit" in this context is to be understood to mean, in particular, a unit provided, at least partially, to control, in particular, the drive unit of the hand power tool, by open-loop and/or closed-loop control, at least when the hand power tool is in an operating state. Preferably, the electronic unit comprises at least one motor controller of the drive unit. The electronic unit preferably has electronic components such as, in particular, at least one transistor, at least one capacitor, at least one process, particularly preferably at least one field-effect transistor (MOSFET) and/or at least one bipolar transistor, in particular having an insulated gate electrode (IGBT).

"Cooling" in this context is to be understood to mean, in particular, an at least partial removal of thermal energy that is produced and/or given off, in particular when the hand power tool is in an operating state, in particular from at least one heat-critical component of the hand power tool. A "heat-critical" component in this context is to be understood to mean, in particular, an element, a unit and/or a region of the hand power tool whose operation and/or function may be negatively affected by the thermal energy produced, in particular when the hand power tool is in an operating state, and/or may be destroyed, at least partially, by the thermal energy produced, in particular when the hand power tool is in an operating state. In a particularly preferred exemplary embodiment, in particular, the drive unit and/or the electronic unit comprises/comprise a heat-critical component of the hand power tool. Alternatively or additionally, the cooling unit may also be provided, at least partially, to cool another unit considered appropriate by persons skilled in the art, and/or another element and/or region considered appropriate by persons skilled in the art, such as, in particular, a grip region, of the hand power tool.

An "open-loop and/or closed-loop control" in this context is to be understood to mean, in particular, an operation that is at least partially independent of an operating state of the drive unit and/or of the electronic unit, in particular at least partially decoupled from a rotational speed of the drive unit, which operation is provided, at least partially, to actively influence an operation of, at least the cooling device, and/or to adapt and/or approximate the operation of the cooling device, at least partially, to a predefined functional sequence, and/or to alter, in particular actively, in particularly dynamically variable operating parameters of the cooling device, preferably according to an algorithm. The open-loop and/or closed-loop control unit may be realized such that, in particular, it is at least partially mechanical, particularly preferably, at least partially electronic. Preferably, the open-loop and/or closed-loop control unit additionally comprises a computing unit and, in particular, in addition to the computing unit, a memory storage unit having, stored therein, an open-loop and/or closed-loop control program provided to be executed by the computing unit.

The configuration according to the disclosure makes it possible to achieve advantageously good cooling of the drive unit and/or of the electronic unit, and consequently a preferably high power density of the hand power tool.

It is additionally proposed that the open-loop and/or closed-loop control unit be provided, at least partially, for manual open-loop and/or closed-loop control of the cooling device. "Manual" in this context is to be understood to mean, in particular, an actuation and/or activation, in particular by hand, performed and/or initiated, at least partially, by an operator. This makes it possible to achieve a structurally simple and preferably inexpensive configuration of the open-loop and/or closed-loop control unit, and an advantageously flexible open-loop and/or closed-loop control of the cooling unit.

It is furthermore proposed that the open-loop and/or closed-loop control unit be provided, at least partially, for open-loop and/or closed-loop control of the cooling device, at least partially, in dependence on at least one parameter. "In dependence on" in this context is to be understood to mean, in particular, "at least partially caused by". A "parameter" in this context is to be understood to mean, in particular, a characteristic quantity of the hand power tool and/or of at least one component of the hand power tool that preferably varies, in particular, in an operating state. This makes it possible, in an advantageously simple manner, to achieve preferably good adaptation of the cooling device to a respective operating situation, in particular without an active intervention and/or setting by an operator.

Moreover, it is proposed that the hand power tool have a sensor unit, which is provided, at least partially, for sensing the at least one parameter. A "sensor unit" in this context is to be understood to mean, in particular, a unit provided, at least partially, to convert the at least one parameter, which describes and/or comprises, in particular, at least one chemical and/or preferably at least one physical property, into an analog, binary and/or preferably digital electrical signal, and to provide the electrical signal, in particular, to the open-loop and/or closed-loop control unit. The sensor unit preferably comprises at least one temperature sensor, at least one rotational-speed sensor, at least one torque sensor, at least one pressure sensor, at least one speed sensor, at least one virtual sensor and/or at least one other sensor, considered appropriate by persons skilled in the art. This makes it possible to achieve preferably precise open-loop and/or closed-loop control of the cooling device.

In a particularly preferred exemplary embodiment, the sensor unit is provided, at least partially, for sensing a housing temperature of the hand power tool and, if a limit temperature is exceeded, to cool the hand power tool, particularly preferably a handle region of the housing, by means of the cooling device. This makes it possible to achieve a preferably high degree of operating comfort and compliance with the European Standard EN 60745-1.

It is additionally proposed that the open-loop and/or closed-loop control unit be provided, at least partially, for temperature-dependent open-loop and/or closed-loop control of the cooling device. This makes it possible to achieve an advantageously selective cooling of the drive unit and/or electronic unit, and a preferably high power density of the hand power tool.

Moreover, it is proposed that the open-loop and/or closed-loop control unit be provided, at least partially, for time-dependent open-loop and/or closed-loop control of the cooling device. The open-loop and/or closed-loop control unit can preferably be provided to activate and/or increase the cooling by the cooling device, in particular after a defined period of operation of the hand power tool. This makes it possible to achieve preferably good cooling, and consequently an advantageously high power density, of the hand power tool.

It is furthermore proposed that the open-loop and/or closed-loop control unit be provided, at least partially, for power-dependent open-loop and/or closed-loop control of the cooling device. The open-loop and/or closed-loop control unit can preferably be provided to activate and/or increase the cooling by the cooling device, in particular in dependence on a power consumption, a rotational speed and/or a torque of the drive unit, and/or in dependence on at least one other power-related characteristic quantity of the hand power tool considered appropriate by persons skilled in the art. This makes it possible to achieve preferably good cooling, preferably in dependence on power and application, and consequently an advantageously high power density, of the hand power tool.

It is additionally proposed that the cooling device have at least one positioning element, which is provided at least for setting a cooling stream. "Setting" in this context is to be understood to mean, in particular, active influencing, in particular of a position and/or a setting of the at least one positioning element. Preferably, the at least one positioning element has at least two positions and/or settings, which are each provided for deflecting a cooling stream of the cooling device. This makes it possible to achieve advantageously good cooling of the drive unit and/or of the electronic unit by at least a part of the cooling device.

Moreover, it is proposed that the open-loop and/or closed-loop control unit is provided, at least partially, for open-loop and/or closed-loop control of the at least one positioning element. This makes it possible to achieve advantageously easy setting of the positioning element and preferably good cooling by the cooling device.

It is furthermore proposed that the drive unit comprise at least one EC motor. An "EC motor" in this context is to be understood to mean, in particular, a brushless, electrically commutated motor. This makes it possible to achieve a preferably high-power, advantageously compact and inexpensive configuration of the drive unit of the hand power tool.

The hand power tool according to the disclosure is not intended in this case to be limited to the application and embodiment described above. In particular, the hand power tool according to the disclosure may have individual elements, components and units that differ in number from a number stated herein, in order to fulfill a principle of function described herein.

BRIEF DESCRIPTION OF THE DRAWINGS

Further advantages are given by the following description of the drawing. The drawing shows an exemplary embodiment of the disclosure. The drawing and the description contain numerous features in combination. Persons skilled in the art will also expediently consider the features individually and combine them to create appropriate further combinations.

In the drawing.

DETAILED DESCRIPTION

Figure 1:
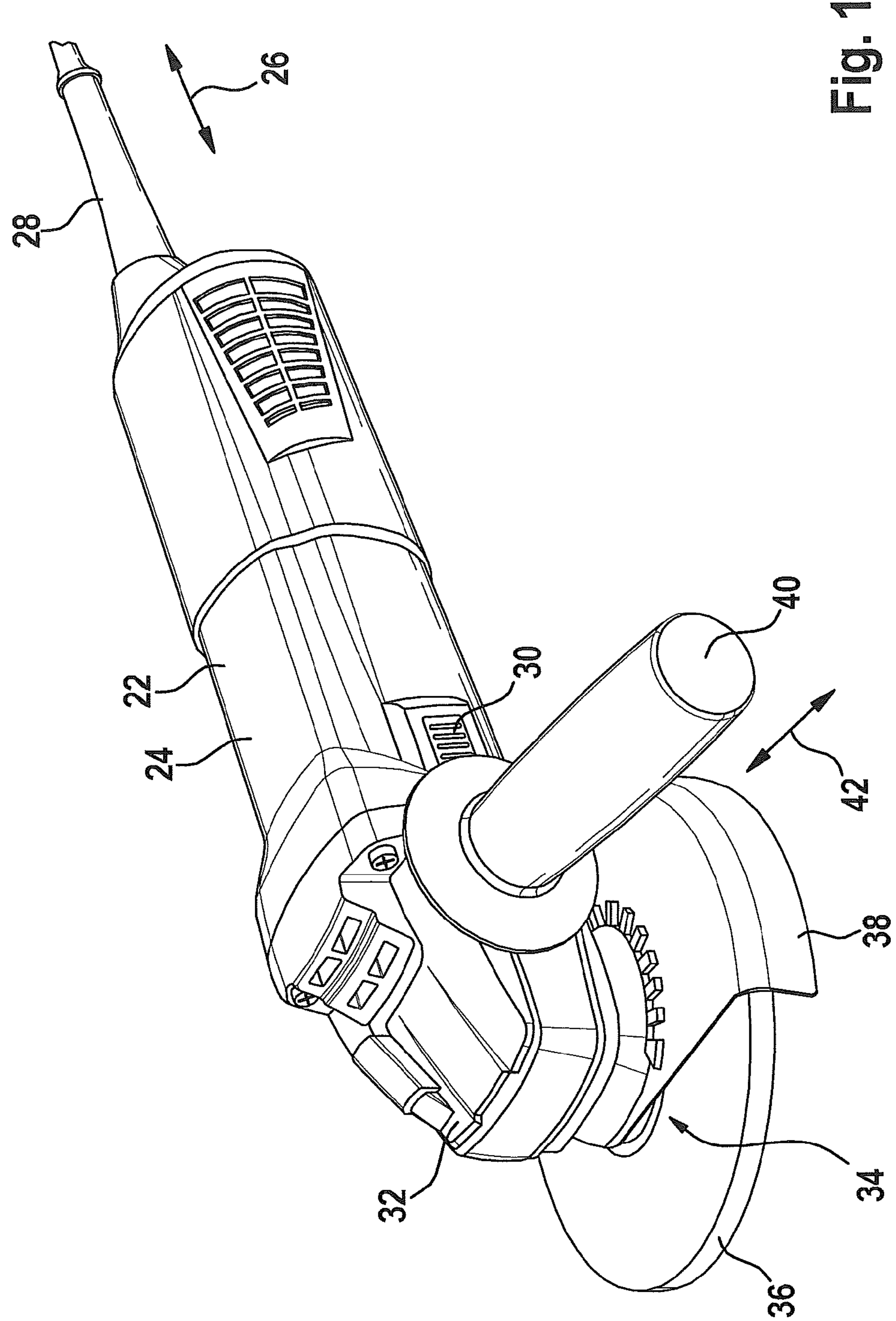
FIG. 1 shows a schematic, perspective view of a hand power tool according to the disclosure.

A hand power tool is represented in FIG. 1. The hand power tool is constituted by an angle grinder. Also conceivable, however, are other configurations of the hand power tool considered appropriate by persons skilled in the art, such as, for example, as a power drill, hammer drill, oscillating hand power tool or orbital sander. The hand power tool comprises a housing 22. The housing 22 is made of a plastic. The housing 22 constitutes a main handle 24, which is provided to be gripped by an operating hand of an operator. A power cable 28 is disposed at one end of the housing 22, as viewed in the direction of main extent 26 of the hand power tool. The power cable 28 is provided to supply electrical energy to a drive unit 10 of the hand power tool. The power cable 28 is provided to be connected to an electrical power network. For this purpose, the power cable 28 has a plug element, not represented. It is also conceivable, however, for the hand power tool to be constituted by a battery-powered hand power tool. The hand power tool additionally has a switching element 30, which is configured to be operated by an operator. The switching element 30 is provided to activate the drive unit 10. The switching element 30 is constituted by a slide switch.

The hand power tool additionally has a transmission housing 32. The transmission housing 32 is connected to the housing 22, at an end of the housing 22 opposite to the power cable 28. The transmission housing 32 is made of a metal. The transmission housing 32 is made of aluminum. The hand power tool comprises a tool receiver 34, not represented in greater detail, which is provided to receive and captively hold an insert tool 36. The insert tool 36 is constituted by an abrasive disc. The insert tool 36 is detachably connected to the tool receiver 34. The tool receiver 34 is disposed at an open end of the transmission housing 32, as viewed perpendicularly in relation to the direction of main extent 26 of the hand power tool. The tool receiver 34 projects out of the transmission housing 32. In addition, a protective hood 38 is coupled to the tool receiver 32. The protective hood 38 is detachably connected to the hand power tool.

The hand power tool additionally has an ancillary handle 40. The ancillary handle 40 is provided to be gripped by a further operating hand of the operator. The ancillary handle 40 is detachably coupled to the hand power tool. When the ancillary handle 40 is mounted on the hand power tool, a direction of main extent 42 of the ancillary handle 40 is perpendicular to the direction of main extent 26 of the hand power tool and parallel to a plane of main extent of the insert tool 36.

Figure 2:
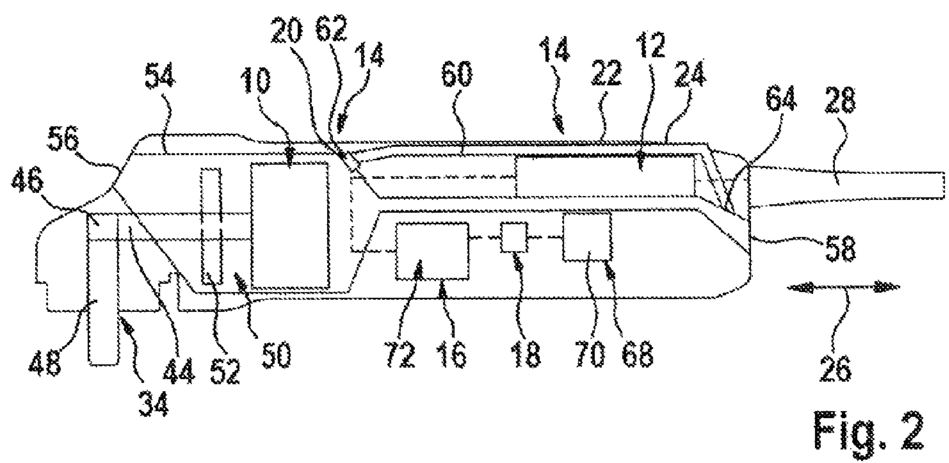
FIG. 2 shows a schematic representation of the hand power tool according to the disclosure, in a sectional view.

The hand power tool has the drive unit 10, an electronic unit 12 and a cooling device 14 (FIG. 2). The housing 22 of the hand power tool surrounds the drive unit 10, the electronic unit 12 and the cooling device 14. The drive unit 10 comprises an electric motor. The drive unit 10 comprises an EC motor. The drive unit 10 has an output shaft 44, which is connected to a drive shaft 48 via a transmission unit 46. The transmission unit 46 has a bevel gear transmission, not represented. The drive shaft 48 is provided for driving an insert tool 36, not represented here, which is coupled to the tool receiver 34. The drive shaft 48 is coupled to the tool receiver 34. The drive shaft 48 is coupled to the tool receiver 34 in a form-fitting and/or force-fitting manner. The drive shaft 48 extends perpendicularly in relation to the output shaft 44. The drive shaft 48 is perpendicular to the direction of main extent 26 of the hand power tool.

The drive unit 10 is operatively connected to the electronic unit 12. The drive unit 10 is electronically connected to the electronic unit 12. The electronic unit 12 is provided for open-loop control or closed-loop control of the drive unit 10. Alternatively or additionally, the electronic unit 12 may also be provided for open-loop control or closed-loop control of a further functional unit considered appropriate by persons skilled in the art. The electronic unit 12 comprises field-effect transistors. The electronic unit 12 comprises metal-oxide semiconductor field-effect transistors (MOSFET). Alternatively or additionally, the electronic unit 12 may also comprise other electronic components considered appropriate by persons skilled in the art, such as, for example, a bipolar transistor having an insulated gate electrode (IGBT).

The cooling device 14 is provided for cooling the drive unit 10 and the electronic unit 12. It is also conceivable, however, for the cooling device 14 to be provided for cooling either the electronic unit 12 or the drive unit 10. Alternatively or additionally, it is also conceivable for the cooling device 14 to be provided for cooling a different functional unit of the hand power tool, considered appropriate by persons skilled in the art. The cooling device 14 has a first cooling unit 50, which is provided for cooling the drive unit 10 and the electronic unit 12. The first cooling unit 50 comprises a fan element 52, which is provided for generating a cooling stream. The fan element 52 is constituted by a fan propeller. The fan element 52 is connected to the drive unit 10, and is driven by the drive unit 10 when in an operating state. The fan element 52 is connected to the output shaft 44 of the drive unit 10 in a rotationally fixed manner. The first cooling unit 50 additionally comprises a cooling channel 54, which is provided to guide the cooling stream generated by the fan element 52. The fan element 52 is disposed radially inside the cooling channel 54.

The cooling channel 54 guides the cooling stream past the drive unit 10 and the electronic unit 12. When the drive unit 10 is in an operating state, the fan element 52 of the first cooling unit 50 is driven. In this case, air is drawn as a cooling stream, out of the environment of the hand power tool and into the cooling channel 54, through an inlet opening 56 let into the transmission housing 32 of the hand power tool. The inlet opening 56 is disposed at an end of the hand power tool that faces toward the tool receiver 34, as viewed in the direction of main extent 26 of the hand power tool. The cooling stream flows in the cooling channel 54, past the drive unit 10 and the electronic unit 12, to an outlet opening 58. The outlet opening 58 is let into the housing 22 of the hand power tool. The outlet opening 58 is disposed at an end of the hand power tool that faces toward the power cable 28 and away from the inlet opening 56, as viewed in the direction of main extent 26 of the hand power tool. In an operating state, the cooling stream emerges, through the outlet opening 58, from the cooling channel 54 of the first cooling unit 50 and from the housing 22 of the hand power tool, and is discharged to the environment of the hand power tool. It is also conceivable, however, for the cooling stream to flow through the cooling channel 54 in the opposite direction, in which case air is drawn in through the outlet opening 58 disposed at the end of the hand power tool that faces toward the power cable 28, as viewed in the direction of main extent 26 of the hand power tool, and is output to the environment of the hand power tool through the intake opening 56 disposed at an end of the hand power tool that faces toward the tool receiver 34, as viewed in the direction of main extent 26 of the hand power tool. As a result, intake of dirt and dust from a working region of the hand power tool can be prevented.

The first cooling unit 50 comprises an ancillary cooling channel 60. The ancillary channel 60 is connected to the cooling channel 54 via an inlet interface 62 and via an outlet interface 64. The inlet interface 62 is provided to route the cooling stream, which, in an operating state, is routed through the cooling channel 54, partially into the ancillary cooling channel 60. The outlet interface 64 is provided to route back into the cooling channel 54 the part of the cooling stream that is routed through the ancillary channel 60. Alternatively, it is also conceivable for the part of the cooling stream that is routed through the ancillary channel 60 to be discharged directly to the environment of the hand power tool via a further outlet opening, not represented, and it is thus possible to dispense with the outlet interface 64. The ancillary channel 60 is provided to guide the part of the cooling stream past the electronic unit 12. The ancillary channel 60 and the cooling channel 54 of the first cooling unit 50 are provided for mutually separate cooling-stream guidance. A positioning element 20, which is provided for setting the cooling stream, is disposed at the inlet interface 62 of the ancillary channel 60. The positioning element 20 is provided, when in one operating state, to close the inlet interface 62 and, when in another operating state, to release the inlet interface 62. The positioning element 20 is provided, when in a normal operating state, to close the inlet interface 62 and, when in another, overload operating state, to release the inlet interface 62.

Figure 3:
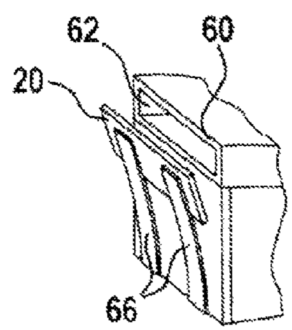
FIG. 3 shows a schematic representation of a positioning element of a cooling device of the hand power tool according to the disclosure.

The positioning element 20 is provided for automatically releasing or closing the ancillary cooling channel 60, without an intervention by an operator of the hand power tool. A drive element 66 is provided for this purpose. Two drive elements 66 are provided (FIG. 3). The drive elements 66 are each made of a bimetal. The drive elements 66 are each realized in the form of a strip, and have a longitudinal extent disposed perpendicularly in relation to a longitudinal extent of the positioning element 20. The drive elements 66 are disposed parallelwise in relation to each other. The positioning element 20 is fixedly connected to the drive elements 66. Heating of the drive elements 66 causes the drive elements 66 to bend, and the positioning element 20 moves away from the inlet interface 62, which constitutes an inlet opening for the cooling stream, and releases the ancillary cooling channel 60. Cooling of the drive elements 66 causes the drive elements 66 to bend, and the positioning element 20 moves toward the inlet interface 62, which constitutes the inlet opening for the cooling stream, and closes the ancillary cooling channel 60. It is also conceivable, however, for the positioning element 20 to be settable by means of a positioning motor and/or for the positioning element 20 to be realized so as to be controllable by open-loop and/or closed-loop control by means of an open-loop and/or closed-loop control unit 16 of the hand power tool.

The cooling device 14 of the hand power tool has a further cooling unit 68, which is provided for cooling the electronic unit 12. The further cooling unit 68 comprises a thermoelectric cooling element 70. The further cooling unit 68 comprises a Peltier element. The further cooling unit 68 is directly coupled to the electronic unit 12. The further cooling unit 68 contacts the electronic unit 12 directly. The cooling element 70 of the further cooling unit 68 is provided to convert an electrical voltage or current intensity, present at an end that faces away from the electronic unit 12, into a temperature difference between the end that faces away from the electronic unit 12 and an end of the cooling element 70 that faces toward the electronic unit 12. In an operating state, the end of the cooling element 70 that faces toward the electronic unit 12 has a lesser temperature than the end of the cooling element 70 that faces away from the electronic unit 12. As a result, the electronic unit 12 is cooled in a region in which the cooling element 70 of the further cooling unit 68 contacts the electronic unit 12. Alternatively or additionally, however, it is also conceivable for the further cooling unit 68 to have a micro-fan element, a fan element or, at least, another cooling element considered appropriate by persons skilled in the art.

The hand power tool additionally comprises the open-loop and/or closed-loop control unit 16, which is provided for open-loop control and/or closed-loop control of the cooling device 14. The open-loop and/or closed-loop control unit 16 is realized as an open-loop control unit 72, and is provided for open-loop control of the cooling device 14. Alternatively or additionally, however, it is also conceivable for the open-loop and/or closed-loop control unit to be realized as a closed-loop control unit, and to be provided for closed-loop control of the cooling device 14. The open-loop control unit 72 is provided for open-loop control of the cooling device 14 in dependence on a parameter. The open-loop control unit 72 may additionally be provided for open-loop control of the cooling device 14 in dependence on a plurality of parameters. Alternatively or additionally, it is also conceivable for the open-loop control unit 72 to be provided for manual open-loop control, for example by means of a setting knob or setting wheel that can be actuated by an operator. The hand power tool comprises a sensor unit 20, which is provided for sensing the parameters.

When the hand power tool is in an operating state, the sensor unit 20 senses a temperature of the electronic unit 12. It is also conceivable, however, for the sensor unit 20 to be provided for sensing an operating period of the hand power tool, a rotational speed and/or a power consumption of the drive unit 10 and/or another parameter of the hand power tool considered appropriate by persons skilled in the art. The open-loop control unit 72 is provided for temperature-dependent open-loop control of the cooling device 14. It is also conceivable, however, for the open-loop control unit 72 to be provided for time-dependent open-loop control, for power-dependent open-loop control, and/or for open-loop control of the cooling device 14 that is dependent on another parameter considered appropriate by persons skilled in the art. The open-loop control unit 72 evaluates the parameter sensed by the sensor unit 20, compares the parameter sensed by the sensor unit 20 with limit values that have been predefined and stored in the open-loop control unit 72, and controls the cooling device 14 according to a control algorithm stored in the open-loop control unit 72. If the sensed temperature of the electronic unit 12 attains or exceeds a maximum temperature $T_{max}$ or $T_1$, the further cooling unit 68 of the cooling device 14 is activated, and an electrical voltage or current intensity is applied to the cooling element 70, such that the thermoelectric cooling element 70 of the further cooling unit 68 cools the electronic unit 12 (FIGS. 4*a* and 4*b*).

Figure 4A:
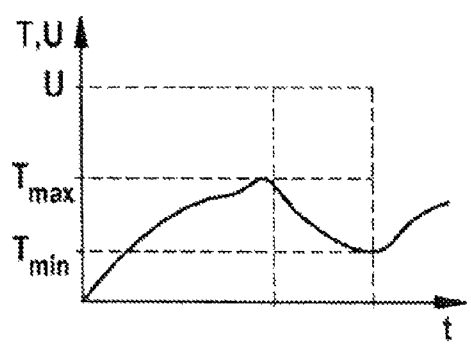
FIG. 4*a* shows a diagram with a parameter plotted as a function of time, and with a characteristic of at least a part of the cooling device, plotted as a function of time.

If the sensed temperature of the electronic unit 12 attains or exceeds a maximum temperature $T_{max}$, the further cooling unit 68 of the cooling device 14 is activated, and an electrical voltage U is applied to the cooling element 70, as a result of which the thermoelectric cooling element 70 generates a temperature difference and cools the electronic unit 12 (FIG. 4*a*). The cooling device 14, when in the state of having been activated by the open-loop control unit 72, has a constant cooling power. A steady-state, constant electrical voltage U is present at the thermoelectric cooling element 70 of the further cooling unit 68, as a result of which a steady-state, constant cooling temperature is produced. If the sensed temperature of the electronic unit 12 falls below a minimum temperature $T_{min}$, the open-loop control unit 72 reactivates the further cooling unit 68 and deactivates the thermoelectric cooling element 70 of the further cooling unit 68. As a result, the cooling power of the thermoelectric cooling element 70 of the further cooling unit 68 falls toward zero.

Figure 4B:
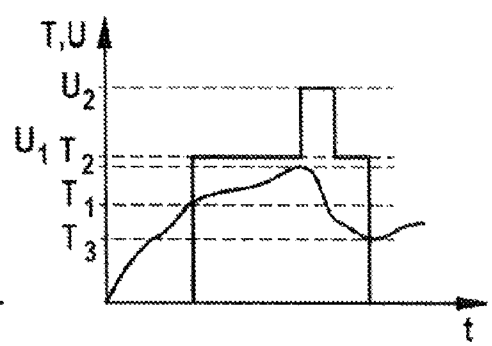
FIG. 4*b* shows a further diagram of a parameter plotted as a function of time, and with an alternative characteristic of at least part of the cooling device, plotted as a function of time.

It is also conceivable, however, for the cooling device 14, when in the state of having been activated by the open-loop control unit 72, to have a plurality of cooling power stages that have a linear characteristic (FIG. 4*b*). If the sensed temperature of the electronic unit 12 attains or exceeds a first limit temperature $T_1$, the further cooling unit 68 of the cooling device 14 is activated, and an electrical voltage is applied to the cooling element 70, as a result of which the thermoelectric cooling element 70 generates a temperature difference and cools the electronic unit 12. A steady-state, constant electrical voltage $U_1$ is present at the thermoelectric cooling element 70 of the further cooling unit 68, as a result of which a steady-state, constant cooling temperature is produced. If the sensed temperature of the electronic unit 12 attains or exceeds a further limit temperature $T_2$, the further cooling unit 68 of the cooling device 14 is activated, and a further steady-state, constant electrical voltage $U_2$ is applied to the cooling element 70, as a result of which a further steady-state, constant cooling temperature is produced.

The further cooling temperature has a lesser temperature value than the first cooling temperature. If the sensed temperature of the electronic unit 12 falls below a limit temperature $T_3$, the open-loop control unit 72 reactivates the further cooling unit 68 and deactivates the thermoelectric cooling element 70 of the further cooling unit 68. As a result, the cooling power of the thermoelectric cooling element 70 of the further cooling unit 68 falls toward zero.

What is claimed is:

1. A hand power tool, comprising:

a drive unit;

an electronic unit configured to control the drive unit;

a cooling device including a first cooling unit configured to cool the drive unit and the electronic unit a second cooling unit configured to additionally cool the electronic unit; and at least one of an open-loop control unit and a closed-loop control unit configured to control the cooling device.

2. The hand power tool according to claim 1, wherein the at least one of the open-loop control unit and closed-loop control unit is configured to manually control the cooling device.

3. The hand power tool according to claim 1, wherein the at least one of the open-loop control unit and closed-loop control unit is configured to control the cooling device based on at least one parameter.

4. The hand power tool according to claim 3, further comprising a sensor unit configured to sense the at least one parameter.

5. The hand power tool according to claim 1, wherein the at least one of the open-loop control unit and the closed-loop control unit is configured to control the cooling device based on temperature.

6. The hand power tool according to claim 1, wherein the at least one of the open-loop control unit and closed-loop control unit is configured to control the cooling device based on time.

7. The hand power tool according to claim 1, wherein the at least one of the open-loop control unit and closed-loop control unit is configured to control the cooling device based on power.

8. The hand power tool according to claim 1, wherein the first cooling unit includes a first air channel configured to guide a cooling stream from an inlet opening, past the drive unit, to an outlet opening, wherein the first cooling unit includes a second cooling air channel configured to guide a portion of the cooling stream from an inlet interface to the first cooling channel, past the electronic unit, to the outlet opening, and wherein the cooling device includes at least one positioning element configured to open and close the inlet interface.

9. The hand power tool according to claim 8, wherein the at least one of the open-loop control unit and closed-loop control unit is configured to control the at least one positioning element.

10. The hand power tool according to claim 1, wherein the drive unit includes at least one electrically commutated motor.

11. The hand power tool of claim 1, wherein the hand power tool is an angle grinder.

12. The hand power tool of claim 1, wherein said first cooling unit comprises a fan element and said second cooling unit comprises a thermoelectric cooling element.

13. The hand power tool of claim 12, wherein said second cooling unit contacts the electronic control unit directly.

14. A hand power tool, comprising:

a drive unit;

an electronic unit configured to control the drive unit;

a cooling device including a first cooling unit configured to cool the drive unit and the electronic unit; and at least one of an open-loop control unit and a closed-loop control unit configured to control the cooling device, wherein the first cooling unit includes a first air channel configured to guide a cooling stream from an inlet opening, past the drive unit and the electronic unit, to an outlet opening, wherein the first cooling unit includes a second cooling air channel configured to guide a portion of the cooling stream from an inlet interface to the first cooling channel and past the electronic unit to the outlet opening, and wherein the cooling device includes at least one positioning element configured to open and close the inlet interface.

15. The hand power tool according to 14, wherein said inlet interface is connecting the first air channel and the second air channel.

16. The hand power tool of claim 15, wherein a heat-activated drive element is provided to automatically release or close the inlet interface based on temperature.

17. The hand power tool of claim 16, wherein said drive element is made of a bimetal.

* * * * *